3,017,677
COMPOSITION AND METHOD OF FORMING
CERAMIC CORES
Herbert Greenewald, Jr., 5725 Ridgetown Circle,
Dallas, Tex.
No Drawing. Filed July 20, 1959, Ser. No. 828,046
11 Claims. (Cl. 22—194)

This invention relates to a composition for and a method of forming ceramic articles such as refractory cores for casting molds.

Previous processes of forming ceramic cores for foundry and other purposes have had the disadvantages of requiring excessive drying time or of utilizing certain ingredients which have short pot life so that only small quantities can be prepared at a time. Moreover, such processes necessitate limitation in the design of the article, and produce articles having poor homogeneity resulting, for instance, from bubbles of steam or volatile ingredients used or released in the curing process.

Accordingly, it is the object of the present invention to provide a ceramic refractory article and method of making the same which avoids the above disadvantages.

A more detailed object is to provide a new and improved method for forming ceramic shapes of intricate design and of a wide variety of sizes.

Another object is to provide a method of forming ceramic articles having excellent strength and great homogeneity.

Another object is to provide a ceramic article which will not shrink, warp, or otherwise distort during subsequent firing or preheating.

Another object is to provide a ceramic article for refractory purposes which utilizes no organic bonding material and, accordingly, avoids the shrinkage and metallurgical problems resulting from the destruction of such bonding material upon contact by molten metal in the casting process.

Another object is to provide an inorganic thermosetting bond for ceramic material.

Another object is to provide a novel composition of material for use in making ceramic cores and the like which materials, in the finished state, is substantially inert to all common metals in the molten state.

Another object is to provide a ceramic core which retains its superior strength and hardness at all temperatures up to its incipient fusion point.

Another object is to provide a novel method of forming and curing ceramic refractory materials without the escape of steam or other volatile constituents, whereby the curing can take place in a completely closed and tight die.

Still another object is to provide a process for forming ceramic refractory articles utilizing a moldable material which has exceptionally long pot life, that is, will not deteriorate when stored a reasonable length of time, yet which will cure very rapidly in the heated die or mold.

In carrying out the novel method, a ceramic, putty-like material is prepared from the following preferred ingredients, the proportions being by weight:

600 parts silica flour (200 mesh)
12 parts non-acidic bentonite
46 part Lumnite cement (calcium aluminate)
140 parts sodium silicate solution
60 parts silicone oil (10,000 centistoke viscosity)
40 parts water In the above example the sodium silicate ingredient is basically a water glass containing 30% $SiO_2$, 9% $Na_2O$, and the balance water. For certain types of cores I have found it advantageous to increase the soda content of the water glass, such as by the addition of sodium hydroxide, to as much as 18% $Na_2O$ with a corresponding reduction in the resultant percentage of silica to 15% $SiO_2$, this admixture being performed before the water glass is added to the balance of the ingredients.

In the preferred method, all dry ingredients are mixed together, and the wet ingredients are mixed together separately from the dry ingredients. Since silicone oil and water are not miscible, the water glass, silicone oil and water should be beaten into an emulsion before adding to the mixed dry ingredients. The water is used to provide the desired workability as required by an injection apparatus and may be entirely omitted if the percentages of sodium silicate and silicone are sufficiently increased. It is the total of the true liquid ingredients added to the dry mixture which is important, regardless of the relative proportions of liquid contained in the sodium silicate solution, silicone, and water, which determines the workability of the mixture.

The resultant putty-like material is then injected into a closed steel die heated to a temperature of from 150° F. to 450° F. The preferred die temperature is 275° F. I have found that if the die temperature is below 150° F., curing time is extremely slow, being measured in hours. If the die is above 450° F., sticking of the ceramic to the die becomes a serious problem. With the higher die temperatures, very rapid injection of the ceramic material into the die must be achieved or the material will cure partially during the injection process and a faulty part will result. For a ceramic shape approximately 5 inches long by 1 inch wide by ⅓ inch thick, with a die temperature of 275° F., curing will occur in approximately two minutes. Variation in the curing time of from 1 to 10 minutes is necessary in accordance with the size of the ceramic cores. A reaction product of the Lumnite cement and the sodium silicate, formed during curing, constitutes an inorganic thermosetting binder for the core material. The room temperature pot life of this same material is approximately 24 hours. This is an important characteristic for production, since it enables relatively large quantities of the agglomerate to be made up at one time.

The cores, as formed and cured, may be assembled immediately into the molds and preheated to 1300°–1600° F., as is necessary for casting brass, bronze, and alloys having similar melting points. The preheat temperature completely dries off the silicone oil. The core material does not fuse under the stated preheat conditions.

For use with higher preheat temperatures necessary in casting higher melting point metals such as steel, nickel base alloys, etc., it is necessary to treat these ceramic cores in the following manner prior to assembly into the mold:

The core is preheated to remove the silicone content, or a concentrated hydrochloric acid soak will accomplish the same result. The core, after the removal of the silicone oil, is then soaked from 1 to 24 hours in a concentrated solution of zirconium oxychloride. This reacts with the reaction products of the Lumnite cement and water glass to form compounds whose complete identity is not currently known, but which withstand much higher temperatures without fusion than the original compounds. The soaked core is then dried and soaked in ammonium hydroxide solution to remove residual chloride ions. Upon re-drying, the core is then ready for assembly into the mold.

It is contemplated that other refractory flours, such as those of zircon and alumina may be substituted for the silica flour. The silicone oil ingredient is to improve the moldability of the material as well as to act as a parting agent, that is, prevent sticking to the die. Simpler shapes require less silicone oil, as low as 2% by weight of the refractory material, and as much as 15% by weight may be added without damaging the general properties of the material. The sodium silicate solution (water glass) content may vary from 4% to 27% by weight, of the refractory material. The greater the amount of sodium silicate within the above range, the harder and more fusible the core becomes.

Lumnite cement equal to at least 5 percent, by weight, of the total refractory material, appears to be necessary to the reaction. Lumnite cement is the product of the Universal Atlas Cement Division of United States Steel Corporation having general offices at 100 Park Avenue, New York 17, New York, and is advertised by the producer as a calcium aluminate cement. This ingredient combines chemically with the water glass to form a very hard, thermosetting material. Greater amounts of Lumnite cement may be added but as its percentage increases to a major portion the fusibility of the core will be increased, reducing the usefulness of the core. A surplus of Lumnite cement over that required for the reaction with the sodium silicate does not have an inhibiting effect on the reaction. Cores usable for some purposes can be made using Lumnite cement as a complete replacement for silica flour, however.

The bentonite percentage of the refractory material may be varied from one-half of 1 percent up to 10 percent by weight. A non-acidic bentonite, such as the swelling clay commonly referred to as western bentonite, gives best results. Bentonite improves the moldability of the material when used in conjunction with the silicone oil and other ingredients, and a minimum amount of ½ of 1 percent is required to prevent thermoshock cracking or spalling of the core under the impact of molten metal. If more than approximately 2 percent of non-acidic bentonite is added, the core will undergo some slight amount of shrinkage during curing in the die. Above 10 percent, bentonite shrinkage becomes quite excessive and results in cracks in the cores.

By way of recapitulation, the above percentage ranges may be stated as parts by weight, in the example first given, as follows:

0 to 600 parts silica flour
3½ to 65 parts non-acidic bentonite
46 to 646 parts Lumnite cement
26 to 176 parts sodium silicate solution
12 to 97 parts silicone oil
0 to 91 parts water.

Range of true liquid to solid ratio to be from 35/100 to 20/100, true liquid content being defined as the total of silicone oil, water, and water content of the sodium silicate solution. The ratio of liquid to solid desired is primarily a function of the fineness of particle size of the refractory used and of its density. The finer and less dense, the greater ratio of liquid to solids required to give a workable mix, and vice versa.

The composition and method may be varied within the ranges stated above and as will occur to those skilled in the art, and the exclusive use of all modifications as come within the scope of the appended claims is contemplated.

I claim:
1. The method of forming a ceramic core or the like which consists of mixing together silica flour and Lumnite cement to form a granular refractory composite constituting approximately 646 parts by weight of the total ingredients and in which the Lumnite cement constitutes at least 5% by weight of the total ingredients, adding from 3½ parts to 65 parts by weight of non-acidic bentonite, separately forming an emulsion consisting of 12 parts to 97 parts by weight of silicone oil, 26 parts to 176 parts by weight of sodium silicate solution and 0 to 91 parts by weight of water, then adding the liquid emulsion to the dry ingredients to form a putty-like material, injecting said material into a die heated to from 150° F. to 450° F., allowing the mixture to cure in the die for a period of time dependent upon the mass of the article, and removing the article from the die; the Lumnite cement reacting with the sodium silicate during curing to form a bonding agent for the article.

2. The method described in claim 1 including the further steps of preheating the core to remove the silicone content, soaking the core in an aqueous zirconium oxychloride solution, drying the core and then soaking it in an aqueous ammonium hydroxide solution to remove the chloride ions, and re-drying the core.

3. The method of forming a ceramic core consisting of the steps of mixing the following dry ingredients: silica flour (predominantly 200 mesh) and Lumnite cement to form therewith a refractory mixture in which the Lumnite cement constitutes at least 5% by weight of the total ingredients, and non-acidic bentonite in the range from one-half of one percent to 10 percent, of the refractory mixture; by weight, separately mixing together the following liquid ingredients: water glass in the range from 4 percent to 27 percent, by weight, of the refractory mixture, silicone oil (viscosity 10,000 centistoke) in the range from 2 percent to 15 percent, by weight, of the refractory mixture, and water in the range of 0 to 24 percent by weight; mixing together the dry and liquid ingredients; injecting the mixed ingredients into a closed steel die heated to temperature between 150° F. and 450° F., allowing a curing time of from 1 to 10 minutes depending upon the mass of the core, during which curing the chemical reaction of the Lumnite cement with the water glass produces a reaction product forming a bonding agent for the core; and removing the core from the die.

4. The method described in claim 3 including the additional step of whipping the silicone oil, water glass and water to form an emulsion before mixing the liquid and dry ingredients.

5. The method described in claim 4 further including the steps of preheating the formed core to a temperature of at least 1300° F. to remove the silicone oil ingredient, soaking the core in a concentrated aqueous solution of zirconium oxychloride, drying the core, soaking the dried core in an aqueous solution ammonium hydroxide to remove chloride ions, and redrying the core.

6. In the preparation of a ceramic article consisting of primarily a granular refractory material including at least 5 percent by weight of Lumnite cement, the method of which comprises mixing with such material from one-half of one percent to 10 percent by weight of the refractory material of non-acidic bentonite as a molding agent, adding 4 percent to 27 percent by weight of sodium silicate solution, 2 percent to 15 percent by weight of silicone oil as an inorganic parting agent, and sufficient water to render the composition readily workable into the desired shape, the ratio of Lumnite cement to sodium silicate solution being sufficient to cause a chemical reaction therebetween when the article is raised to temperatures above 150° F.

7. The method of making a highly refractory ceramic material for use as mold cores and the like which consists in mixing a ceramic flour (approximately 200 mesh) of a material of the class which includes silica, alumina, zircon and similar oxides in the proportion of approximately 600 parts by weight, from 3½ to 65 parts by weight of non-acidic bentonite, approximately 46 parts of Lumnite cement, from 26 to 176 parts of water glass of the composition from 15 to 30 percent $SiO_2$ and 9 to 18 percent $Na_2O$ and the balance water, 12 to 97 parts silicone oil of approximately 10,000 centistoke viscosity, and sufficient water to provide the desired degree of workability, the ratio of Lumnite cement to water glass being sufficient to cause a chemical reaction therebetween when the ceramic material is heated above 150° F.

8. The method described in claim 7 in which the water glass ingredient is of the approximate formula: 30% $SiO_2$, 9% $Na_2O$, and 61% water, by weight.

9. The method of improving the refractoriness of a baked molding core of a composition consisting essentially of finely divided refractory material, and a reaction product of Lumnite cement and water glass, as a binder, which includes the steps of soaking the core in an aqueous zirconium oxychloride solution, drying the core, then soaking the core in an aqueous ammonium hydroxide solution, and redrying.

10. A composition of matter adapted for use in forming baked ceramic molding cores and the like consisting of approximately 646 parts by weight of a granular composite containing silica flour and Lumnite cement wherein the Lumnite cement constitutes at least 5% by weight of the composite, from 3½ parts to 65 parts by weight of non-acidic bentonite and from 12 parts to 97 parts by weight of silicone oil of approximately 10,000 centistoke viscosity as plasticizing agents, 26 parts to 176 parts by weight of sodium silicate solution (water glass) and sufficient water to provide the desired workability, the ratio of Lumnite cement to sodium silicate solution being sufficient to cause a chemical reaction therebetween when the core is heated to between 150° F. and 450° F., the reaction product forming a bonding agent for the core.

11. A foundry core consisting of substantially the following ingredients in the proportions stated: silica flour (predominately 200 mesh)—600 parts, non-acidic bentonite—12 parts, Lumnite cement—46 parts, sodium silicate solution (water glass)—140 parts, silicone oil (approximately 10,000 centistoke viscosity)—60 parts, and water—40 parts, and further characterized by a chemical reaction between the Lumnite cement and the sodium silicate solution when the core is heated to between 150° F. and 450° F., the reaction product forming a bonding agent for the core.

References Cited in the file of this patent

UNITED STATES PATENTS

| | | |
|---|---|---|
| 2,081,558 | Prange | May 25, 1937 |
| 2,682,092 | Henricks | June 29, 1954 |
| 2,748,435 | Hackett | June 5, 1956 |
| 2,878,539 | Halpern et al. | Mar. 24, 1959 |
| 2,896,280 | Ilenda et al. | July 28, 1959 |
| 2,899,725 | Zink et al. | Aug. 18, 1959 |
| 2,949,375 | Reuter | Aug. 16, 1960 |
| 2,950,205 | Cardaras | Aug. 23, 1960 |

FOREIGN PATENTS

| | | |
|---|---|---|
| 650,467 | Great Britain | Feb. 28, 1951 |